US012655749B2

(12) United States Patent
Cuevas Maldonado et al.

(10) Patent No.: US 12,655,749 B2
(45) Date of Patent: Jun. 16, 2026

(54) METHOD FOR PREDICTING A RESERVOIR'S STRUCTURE, PETROPHYSICAL PROPERTIES, AND ASSOCIATED UNCERTAINTY IN FRONT OF A DRILL BIT

(71) Applicant: Schlumberger Technology Corporation, Sugar Land, TX (US)

(72) Inventors: Nestor Herman Cuevas Maldonado, Tananger (NO); Hilde Grude Borgos, Tananger (NO); Geir Vaaland Dahl, Tananger (NO); Michael Hermann Nickel, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/267,114

(22) Filed: Jul. 11, 2025

(65) Prior Publication Data

US 2026/0160159 A1    Jun. 11, 2026

Related U.S. Application Data

(60) Provisional application No. 63/730,307, filed on Dec. 10, 2024.

(51) Int. Cl.
*E21B 47/0224* (2012.01)
*G01V 1/46* (2006.01)

(52) U.S. Cl.
CPC ............ *E21B 47/0224* (2020.05); *G01V 1/46* (2013.01); *G01V 2200/16* (2013.01)

(58) Field of Classification Search
CPC ............ E21B 47/0224; G01V 1/40–52; G01V 2200/16
See application file for complete search history.

(56) References Cited

U.S. PATENT DOCUMENTS

| | | | |
|---|---|---|---|
| 6,549,854 B1 | 4/2003 | Malinverno | |
| 2015/0191985 A1* | 7/2015 | Berger ................. | E21B 47/013 |
| | | | 175/50 |
| 2016/0341834 A1* | 11/2016 | Bartetzko ............... | G01V 1/50 |
| 2019/0024501 A1 | 1/2019 | Borgos | |
| 2019/0025461 A1* | 1/2019 | Wiener ................. | E21B 47/14 |

OTHER PUBLICATIONS

Antonsen, F. et al., "Geosteering in Complex Mature Fields Through Integration of 3D Multi-Scale LWD-Data, Geomodels, Surface and Time-Lapse Seismic", SPWLA 59th Annual Logging Symposium, SPWLA-2018-Q, Jun. 2, 2018, pp. 1-16, London, UK.

(Continued)

*Primary Examiner* — Kristyn A Hall
(74) *Attorney, Agent, or Firm* — Kyle R. Miiller

(57) ABSTRACT

A method for predicting a reservoir's structure, petrophysical properties, and associated uncertainty in front of a drill bit while drilling includes receiving seismic input data that is captured before drilling begins. The method also includes receiving electrical input data that is captured after drilling begins. The method also includes determining cross-domain relationships between the seismic input data and the electrical input data. The method also includes determining reservoir properties on sides of and/or in front of a trajectory of a well being drilled by a drill bit based upon the cross-domain relationships.

20 Claims, 7 Drawing Sheets

(56)           References Cited

OTHER PUBLICATIONS

Aversana, P. D. et al., "Joint inversion of rock properties from sonic, resistivity and density well-log measurements", Geophysical Prospecting, 2011, pp. 1144-1154 , vol. 59.

Salim, D. C. et al.,"Geosteering Driven by Geophysics—Reservoir Structure Prediction Ahead of Bit", Second EAGE/SPE Geosteering and Well Placement Workshop, Nov. 5, 2018, 4 pages, vol. 2018, Abu Dhabi, UAE.

Seydoux, J. et al., "Full 3D Deep Directional Resistivity Measurements Optimize Well Placement and Provide Reservoir-Scale Imaging While Drilling", SPWLA 55th Annual Logging Symposium, SPWLA-2014-LLLL, May 18, 2014, pp. 1-14, Abu Dhabi, United Arab Emirates.

Tarchiani, C. et al., "Novel While-drilling Workflow for Reservoir Structural Prediction ahead of the Bit", 79th EAGE Conference Exhibition, Jun. 12, 2017, 5 pages, Paris, France.

* cited by examiner

Property prediction ahead of the bit

Resistivity
Behind the bit 2D transverse planes

Bit position

Properties Predicted ahead

Petrophysical
Properties
Behind the bit

Bit position

Properties Predicted ahead

METHOD FOR PREDICTING A RESERVOIR'S STRUCTURE, PETROPHYSICAL PROPERTIES, AND ASSOCIATED UNCERTAINTY IN FRONT OF A DRILL BIT

CROSS-REFERENCE TO RELATED APPLICATIONS

This application claims priority to U.S. Provisional Patent Application No. 63/730,307, filed on Dec. 10, 2024, which is incorporated by reference.

BACKGROUND

Deep directional electromagnetic (EM) measurements acquired while drilling provide reservoir-scale images of electrical resistivity with a depth of investigation (DOI) in excess of 30 m, vertically away from the trajectory of horizontally drilled wells. Sensitivity of the measurements to the properties of the formation in front of the drilling bit is, however, limited due to the diffusive nature of the EM fields induced in the formation. Hence, logging-while-drilling (LWD) measurements and their corresponding interpretation are not set up to provide information of the geo-electric structure ahead of the drilling bit.

In contrast, surface seismic datasets are ubiquitously used to extract various seismic attributes, which in turn are used to provide insights on the expected properties of the formation along a planned well trajectory. Resolution of such attributes (e.g., structural components such as surface planes of the reservoir top, intra-layers, and faults) is low, and their accuracy depends on the processing of the seismic gathers, migration processes, etc., leading to the final seismic cubes of amplitude as a function of depth or time.

Workflows have been shown to enable integrated interpretation of the resistivity distribution obtained from the deep directional EM measurements together with surface seismic data. Integration workflows yield enhanced accuracy and resolution of the structural components around the wellbore, thus resulting in more complex and representative geo-models of the formation. By extension, these workflows can also be used to update the structural information obtained from seismic interpretation and thereby available along the whole extent of the planned well trajectory.

Structural updating workflows can indeed be used to determine real time updates of the geometry of the structural components expected in front of the drilling bit, therefore providing predictive capabilities to complement the existing information available for geo-steering. For example, in one workflow, a resistivity section obtained by LWD measurements is used to estimate a "synthetic" pseudo-seismic section from electrical resistivity data, which is in turn compared with the corresponding section of seismic data obtained along the well trajectory, extracted from pre-existing surface seismic data. The comparison between real and synthetic seismic sections gives rise to a displacement (e.g., difference) field, estimated behind the last measurement of resistivity obtained during drilling. The displacement field is then extrapolated in front of the last resistivity measurement and subsequently applied to the real seismic data and associated structural components (e.g., horizons, faults) interpreted from the seismic data. This effectively provides a prediction of the lateral and vertical position of the structure expected in front of the drilling bit; however, no prediction of the physical (e.g., electrical resistivity, seismic velocity) or petrophysical (e.g., porosity, water saturation, volume of shale) reservoir properties can be inferred with these methods.

Furthermore, other workflows yield a structural update resulting after a sequence of well defined (e.g., deterministic) steps (e.g., where pseudo seismic reflectivities are extracted from the resistivity section and then convolved with a predefined wavelet, and so on thereby). Along each one of these steps, there may be random or systematic errors in the input data, as well as errors on the assumptions made along the processing sequence, etc. These errors are not propagated and thereby structural and reservoir property predictions do not carry an associated uncertainty.

In summary, conventional technologies describe methods to extrapolate structural components, such as faults and seismic horizons, but no information can be obtained of the uncertainty of such an extrapolation, nor of the reservoir properties which one should expect to encounter in front of the drilling bit. Therefore, what is needed is an improved system and method that may determine information related to the uncertainty of the extrapolation and/or of the reservoir properties in front of the drilling bit.

SUMMARY

A method for predicting a reservoir's structure, petrophysical properties, and associated uncertainty in front of a drill bit while drilling is disclosed. The method includes receiving seismic input data that is captured before drilling begins. The method also includes receiving electrical input data that is captured after drilling begins. The method also includes determining cross-domain relationships between the seismic input data and the electrical input data. The method also includes determining reservoir properties on sides of and/or in front of a trajectory of a well being drilled by a drill bit based upon the cross-domain relationships.

A computing system is also disclosed. The computing system includes one or more processors and a memory system. The memory system includes one or more non-transitory computer-readable media storing instructions that, when executed by at least one of the one or more processors, cause the computing system to perform operations. The operations include receiving seismic input data. The seismic input data is captured before drilling begins. The seismic input data is measured behind, on sides of, and in front of a drill bit. The seismic input data includes acoustic impedance measurements and/or seismic amplitude measurements. The seismic input data includes spatial correlations between the acoustic impedance measurements behind the drill bit and the acoustic impedance measurements to the sides of and/or in front of the drill bit. The operations also include receiving electrical input data. The electrical input data is captured after drilling begins. The electrical input data is measured behind the drill bit. The electrical input data includes logging-while-drilling (LWD) electrical property measurements including resistivity measurements. The electrical input data includes spatial correlations between the resistivity measurements behind the drill bit and unknown resistivity measurements to the sides of and/or in front of the drill bit. The operations also include determining cross-domain relationships between the seismic input data and the electrical input data. The operations also include determining reservoir properties to the sides and/or in front of a trajectory of a well being drilled by the drill bit based upon the spatial correlations of the seismic input data, the spatial correlations of the electrical input data, and the cross-domain relationships.

A non-transitory computer-readable medium is also disclosed. The medium includes instructions that, when executed by one or more processors of a computing system, cause the computing system to perform operations. The operations include receiving seismic input data. The seismic input data is captured before drilling begins. The seismic input data is measured behind, to the sides of, and in front of a drill bit. The seismic input data includes acoustic impedance measurements and seismic amplitude measurements. The seismic input data includes spatial correlations between the acoustic impedance measurements behind the drill bit and the acoustic impedance measurements to the sides of and/or in front of the drill bit. The seismic input data also includes seismic uncertainties including measurement errors, noise, and natural variability. The operations also include receiving electrical input data. The electrical input data is captured while drilling. The electrical input data is measured behind the drill bit. The electrical input data includes logging-while-drilling (LWD) electrical property measurements including resistivity measurements. The electrical input data includes spatial correlations between the resistivity measurements behind the drill bit and unknown resistivity measurements to the sides of and/or in front of the drill bit. The electrical input data also includes electrical uncertainties including measurement errors, noise, and natural variability. The operations also include determining cross-domain relationships between the seismic input data and the electrical input data. The cross-domain relationships are determined using a multivariate stochastic model. The cross-domain relationships include correlations between the acoustic impedance measurements and the resistivity measurements. The correlations between the acoustic impedance measurements and the resistivity measurements are estimated based upon the seismic input data and the LWD electrical property measurements behind the drill bit. The correlations between the acoustic impedance measurements and the resistivity measurements are derived using a joint model of rock physics and electrical properties. The joint model includes empirical analytical relations between the acoustic impedance measurements, the resistivity measurements, and reservoir properties. The cross-domain relationships also include correlations between positions of interfaces that capture the acoustic impedance measurements and positions of interfaces that capture the resistivity measurements. The positions of the interfaces that capture the acoustic impedance measurements and the positions of the interfaces that capture the resistivity measurements are estimated based upon the seismic input data and the LWD electrical property measurements behind the drill bit. The cross-domain relationships also include correlations between the seismic amplitude measurements and the unknown resistivity measurements to the sides of and/or in front of the drill bit. The operations also include determining reservoir properties to the sides and/or in front of a trajectory of a well being drilled by the drill bit based upon the spatial correlations of the seismic input data, the spatial correlations of the electrical input data, and the cross-domain relationships. A stochastic model is used to determine a conditional mean and covariance of the reservoir properties conditioned on the acoustic impedance measurements behind, to the sides of, and/or in front of the drill bit and the resistivity measurements behind the drill bit. The stochastic model determines the conditional mean and the covariance of the positions of interfaces that capture the resistivity measurements conditioned on the positions of the interfaces that capture the acoustic impedance measurements behind, to the sides of, and/or in front of the drill bit and the positions of interfaces that capture the resistivity measurements behind the drill bit.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

System Overview

Figure 1:
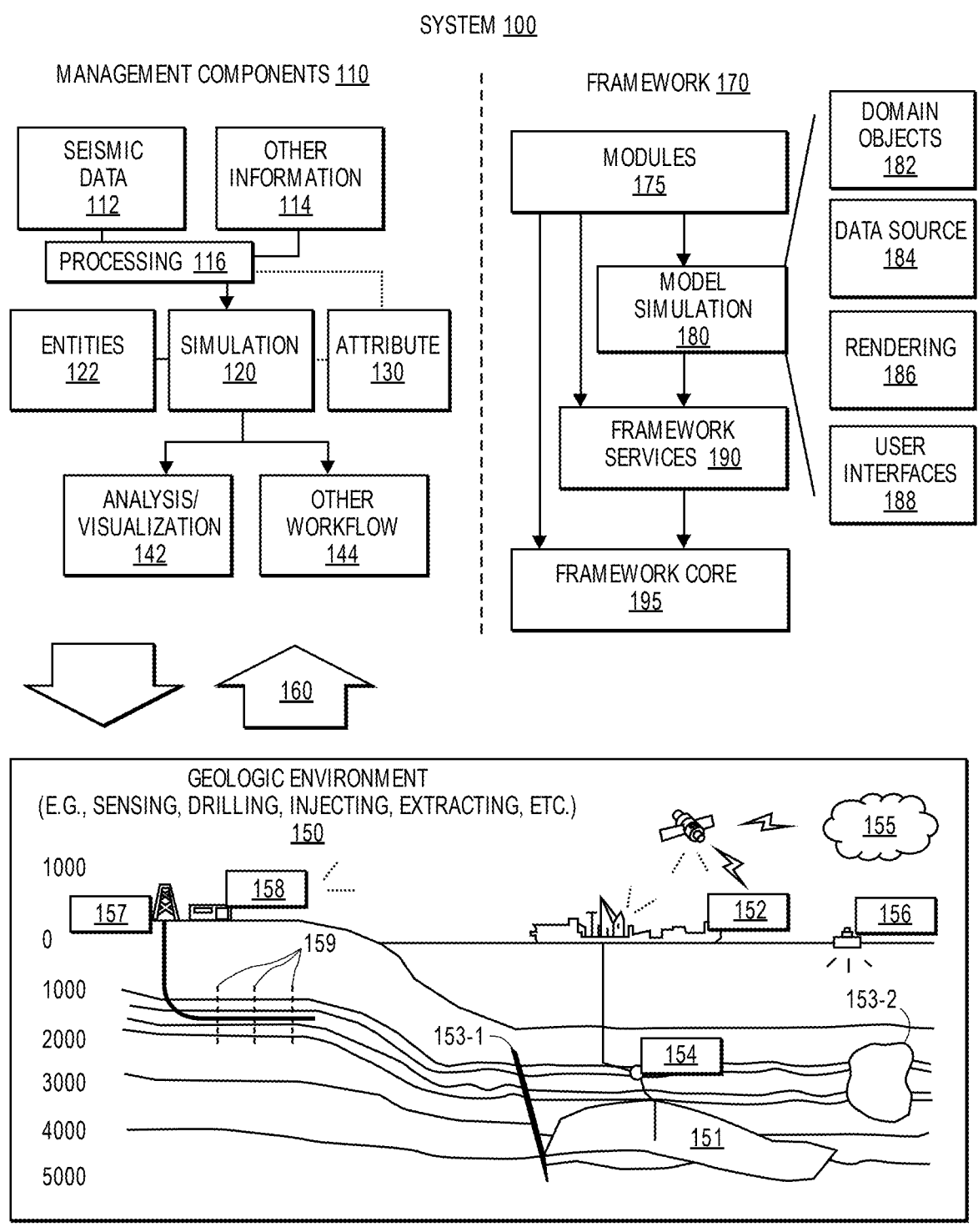
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially avail-able example of an object-based framework is the MICROSOFT®.NET© framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB, Houston Texas), the INTERSECT™ reservoir simulator (SLB, Houston Texas), etc. As an example, a simulation component, a simulator, etc. may include features to implement one or more mesh-less techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (SLB, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (SLB, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Method for Predicting a Reservoir's Structure, Petrophysical Properties, and Associated Uncertainty in Front of a Drill Bit while Drilling The present disclosure integrates seismic data, its structural interpretation, spatial property distributions derived from seismic data with logging-while-drilling (LWD) electrical property measurements, the associated uncertainties to predict the expected geometry of structural components, and spatial distribution of electrical properties in front of the drilling bit, with associated uncertainties. This concept is based on the fact that the quantities entering any prediction workflow are considered to have an associated uncertainty (e.g., measurement errors, noise, natural variability), described by some representative distribution (e.g., normally distributed around a mean value and with a given covariance), and therefore, any predicted quantity should provide a corresponding uncertainty represented (e.g., through confidence intervals). A multivariate stochastic model may be defined that captures cross-domain relationships between the multiple variables and their measurements (e.g., between resistivity and acoustic impedance). The model may describe the spatial correlation of the variables of each measurement domain. In particular, the spatial correlations define the expected relations between the last resistivity measurement behind the bit and the unknown resistivity in front of the bit.

Moreover, the prediction method yields an extrapolated 3D cube of reservoir properties, available in front of the last LWD measurements and to the sides of the well trajectory. Therefore, this data becomes an initial guess of 3D resistivity, which can in turn be used to update (or rerun) the inversion of LWD raw data to further improve the look ahead capabilities of the inversion process.

Look-Ahead Structural Prediction, a Simplified Uncertainty Model

Structural updating workflows are used to determine real time updates of the structural components (e.g. 3D surfaces of the reservoir top and intra-layers, faults, etc.) determined, for example, from seismic data in a pre-job stage, using seismic interpretation tools. To determine the updated position of the structures, a resistivity section obtained by LWD measurements may be used to estimate a "synthetic" pseudo-seismic section from electrical resistivity data, and in turn compared with the corresponding section of seismic data extracted from pre-existing surface seismic data. The difference between real and synthetic seismic sections gives rise to a displacement field, estimated in 2D (or 3D) along (and around) the well trajectory behind the last measurement of resistivity obtained during drilling. The displacement field may then be extrapolated in front and to the sides of the last resistivity measurement and subsequently applied to the structural components (e.g., horizons, faults) interpreted from the seismic data.

Along each of the steps of the workflow, there may be random or systematic errors to the input data, uncertainty associated with the assumptions made along the processing sequence, etc. The input data and parameters with their associated uncertainties can be classified as follows:

1. Pre-drill uncertainties
   1.1. Full stack 3D seismic data—depth migrated
      1.1.1. Processing/migration uncertainty
   1.2. Full stack 3D seismic data—time migrated, with velocity model
      1.2.1. Processing/migration uncertainty
      1.2.2. Velocity model uncertainty
   1.3. Seismic horizon(s) interpretation nearby planned well,
      1.3.1. Uncertainty in vertical position
      1.3.2. Well to seismic tie, sonic/VSP processing, wavelet, stratigraphic to acoustic marker correspondence . . .
   1.4. Fault(s) interpretation nearby planned well
      1.4.1. Uncertainty in vertical and lateral position
      1.4.2. Uncertainty in vertical and lateral extent
   1.5. Estimated wavelet
      1.5.1. Uncertainty in shape (e.g., frequency spectrum and/or wavelet phase)
2. Real-time uncertainties
   2.1. Well trajectory
      2.1.1. Uncertainty in vertical and lateral position
   2.2. Resistivity measurement from LWD
      2.2.1. Inversion uncertainty
      2.2.2. Uncertainty in interpretation of layer boundaries
      2.2.3. Uncertainty in interpretation of faults
   2.3. Synthetic seismic obtained from resistivity
      2.3.1. Uncertainty in resistivity to acoustic impedance mapping
   2.4. Seismic-to-Resistivity calibration
      2.4.1. Uncertainty in estimate of displacement field between seismic domain and Resistivity domain Conventional workflows do not describe how these uncertainties are to be propagated, and thereby structural and reservoir property predictions do not carry any associated uncertainty. A stochastic model is described below, defined by a pre-drill surface interpretation from seismic (uncertainty 1.3) and real-time seismic-to-resistivity calibration (uncertainty 2.4). In a real-time job, the layer boundary transitioned from the seismic domain to the resistivity domain may be compared behind the bit to the corresponding real-time layer boundary interpretation on LWD resistivity measurements (uncertainty 2.2), and a look-ahead prediction of the layer boundary in the resistivity may be obtained by constraining an extrapolation of the surface in the seismic domain with the seismic-to-resistivity calibration. In the stochastic framework, the constrained extrapolation may be obtained through a conditional distribution obtained from the defined variables, with dependencies both between some of the variables and spatially along each variable.

In the suggested stochastic model, it may be assumed that the same layer boundary produces a contrast both in reflectivity in the seismic domain and LWD measurements of resistivity, and that a displacement field provides transformation of the surface geometry from the seismic domain to the resistivity domain. A linear forward model may be defined, where the layer boundary S in the seismic domain, the bulk shift B between the seismic domain and the resistivity domain, and the variation D in the displacement field relative to the bulk shift are assigned Gaussian distributions. The layer boundary G in the resistivity domain may then be described as a function G=g(S, B, D), which is also Gaussian distributed.

Layer Boundary in the Seismic Domain

The layer boundary position in the seismic domain may be assigned a multivariate Gaussian distribution with a specified mean vector and covariance matrix:

$$S \sim N\!\left(\mu_S, \sum\nolimits_S\right) \tag{1}$$

The mean vector $\mu_S$ provides the spatially varying expected layer boundary positions, defined by the pre-drill surface interpretation. The covariance matrix $\Sigma_S$ provides the covariances of the layer boundary positions, constructed from pre-drill trace-by-trace variance in vertical position of the surface interpretation (e.g., relative to the seismic, not to true depth), given as uncertainty 1.3 above, plus a spatial correlation function.

Displacement Field Between the Seismic Domain and the Resistivity Domain

Figure 2:
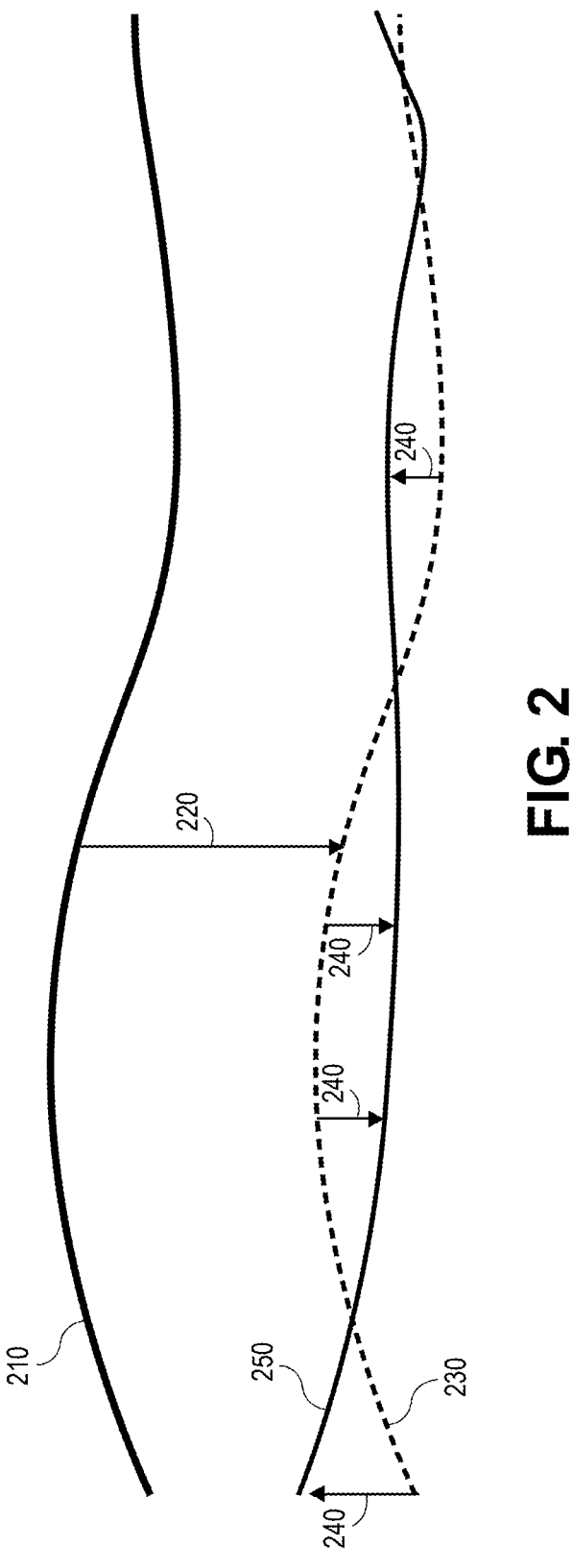
FIG. 2 illustrates the displacement field between the seismic domain and the resistivity domain separated into two parts: (1) a spatially constant bulk-shift and (2) an additional variation around the bulk-shift, according to an embodiment.

FIG. 2 illustrates the displacement field between the seismic domain and the resistivity domain separated into two parts: a spatially constant bulk-shift and an additional variation around the bulk-shift, according to an embodiment. More particularly, FIG. 2 shows the layer boundary in the seismic domain 210, the bulk shift 220 moving the layer boundary in the seismic domain closer to the layer boundary in the resistivity domain 230, the residual displacement field between the seismic domain and the resistivity domain after the bulk shift 240, and the layer boundary in the resistivity domain 250.

The constant bulk shift may be set to a specified scalar (e.g., known bulk shift), or assigned a prior distribution allowing a posterior estimate of the bulk shift to be obtained real-time based on the estimated displacement field. In the latter case, the unknown bulk shift B may be assigned a univariate Gaussian prior distribution with a specified mean $\mu_B$ (e.g., determined when landing the well) and variance $$\sigma_B^2:$$

$$B \sim N(\mu_B, \sigma_B^2)$$

The variations in the displacement field around the bulk shift may be assigned a multivariate Gaussian distribution:

$$D \sim N\left(\mu_D, \sum_D\right) \tag{3}$$

where the mean vector $\mu_D$ provides the expected displacement field values after bulk shift adjustment, pre-defined as a constant (e.g., zero after bulk shift adjustment) or a spatially varying bulk shift (e.g., based on markers in nearby wells, indicating a non-constant bulk shift). The covariance matrix $\Sigma_D$ provides the displacement field covariances after bulk shift adjustment, constructed from the accumulated trace-by-trace variance in vertical displacement, plus a spatial correlation function. The bulk shift variance and trace-by-trace variance should capture a number of the uncertainties listed above, in particular 1.1/1.2, 1.5, and 2.1-2.4.

An additional error term may be included for the observation error of the total displacement field, capturing model errors, estimation errors, etc., and denoted:

$$\varepsilon_D \sim N\left(\mu_{\varepsilon_D}, \sum_{\varepsilon_D}\right) \tag{4}$$

where typically $\mu_{\varepsilon_D}$ is zero and $\Sigma_{\varepsilon_D}$ is a diagonal covariance matrix with trace-by-trace constant variances.

One benefit of including a prior distribution on the bulk shift is the ability to adjust the bulk shift while drilling, updating the estimate with the measurements along the well trajectory instead of relying only on the landing point of the well. However, if a specified constant bulk shift is desirable, $$\sigma_B^2 = 0$$

converts the prior distribution of B into a Dirac delta function with the weight in the specified bulk shift $\mu_B$.

Layer Boundary in the Resistivity Domain

The layer boundary position G in the resistivity domain may be defined as a linear combination of the layer boundary position in the seismic domain and the displacement field, transforming the geometry in the seismic domain into the similar geometry in the resistivity domain, and is hence also Gaussian distributed:

$$G \sim N\left(\mu_G, \sum_G\right) \tag{5}$$

The mean vector $\mu_G$ provides the expected layer boundary positions, and the covariance matrix $\Sigma_G$ provides the layer boundary covariances in the resistivity domain. Both $\mu_G$ and $\Sigma_G$ may be constructed from the parameters of the distributions of the layer boundary S and the seismic-to-resistivity displacement field D.

The actually observed surface in resistivity has an additional error term:

$$\varepsilon_G \sim N\left(\mu_{\varepsilon_G}, \sum_{\varepsilon_G}\right) \tag{6}$$

representing the uncertainty in the resistivity inversion and interpretation, given as 2.2 above, where $\mu_{\varepsilon_G}$ is zero, and $\Sigma_{\varepsilon_G}$ is a diagonal covariance matrix with trace-by-trace constant variances.

Covariance Matrices

In the model description above, two types of covariance matrices are suggested: trace-by-trace variance plus a spatial correlation, or diagonal matrix with trace-by-trace variance. Spatial correlations may be defined through an correlation function:

$$\rho(x) = c(x, r, v), \tag{7}$$

which may depend on a correlation length r>0 and a decay (v) parameter, such that $\rho(0)=1$ and it decays for r>0. Assuming stationarity, element (i, j) of a covariance matrix is expressed as a nonlinear function:

$$\sum_{ij} = \sum(\sigma_i, \sigma_j, x_i, x_j) \tag{8}$$

where $\sigma_i$, $\sigma_j$ are the standard deviations and $x_i$, $x_j$ the lateral positions of traces i, j. In the case of no spatial correlation, the correlation function is expressed as:

$$\rho(x) = \begin{cases} 1, x = 0 \\ 0, x > 0 \end{cases} \tag{9}$$

and the covariance matrix $\Sigma = \Sigma(\sigma_i)$. If, in addition, the standard deviation is assumed to be constant for the traces, the covariance matrix is given as $\Sigma = \sigma^2 I$, where I is the identity matrix.

Look-Ahead Prediction Distribution

To obtain a prediction or estimation with associated uncertainty from the specified model, the multivariate Gaussian joint distribution of the variables, S, B, D, $\varepsilon_D$, $\varepsilon_G$, behind-, around- and ahead-of-the-bit may first be defined. Any subset of the model also follows a multivariate Gaussian distribution, and so does any conditional distribution where one subset of the model is conditioned on observations of another subset of the model.

Let subscript o denote "observation" and subscript p denote "prediction." Hence, observations of the layer boundary in the resistivity domain and the estimated displacement field behind-the-bit may be given as $G_o$, $D_o$ and the desired prediction of the layer boundary position in the resistivity domain around- and ahead-of-the-bit is given as $G_p$. Furthermore, let S(x) and D(x) denote the subsets of S and D respectively at spatial locations x, with a corresponding notation for $\mu_S$ and $\mu_D$, and let $\Sigma(x_i, x_j)$ be the subsets of a covariance matrix with rows at $x_i$ and columns at $x_j$. The notations $x_{D_o}$, $x_{G_o}$ and $x_{G_p}$ denote the spatial locations of displacement field observations, resistivity observations and prediction points, respectively.

The relationships involved in the prediction are given as a function of the observed quantities, such that:

$$D_o = D_o\left(B, D, \varepsilon_D, x_{D_o}\right) \sim N\left(\mu_{D_o}, \sum\nolimits_{D_o}\right) \tag{10}$$

$$G_o = G_o\left(B, S, D, \varepsilon_G, x_{G_o}\right) \sim N\left(\mu_{G_o}, \sum\nolimits_{G_o}\right) \tag{11}$$

$$G_p = G_p\left(B, S, D, x_{G_P}\right) \sim N\left(\mu_{G_P}, \sum\nolimits_{G_p}\right) \tag{12}$$

where $$\mu_{D_o} = \mu_{D_o}\left(\mu_B, \mu_D, \mu_{\varepsilon_D}, x_{D_o}\right) \tag{13}$$

$$\mu_{G_o} = \mu_{G_o}\left(\mu_B, \mu_S, \mu_D, \mu_{\varepsilon_G} x_{G_o}\right) \tag{14}$$

$$\mu_{G_P} = \mu_{G_P}\left(\mu_B, \mu_S, \mu_D, x_{G_P}\right) \text{ and} \tag{15}$$

$$\sum\nolimits_{D_o} = \sum\nolimits_{D_o}\left(\sigma_B^2, \sum\nolimits_D, \sum\nolimits_{\varepsilon_D}, x_{D_o}\right) \tag{16}$$

$$\sum\nolimits_{G_o} = \sum\nolimits_{G_o}\left(\sigma_B^2, \sum\nolimits_S, \sum\nolimits_D, \sum\nolimits_{\varepsilon_G}, x_{G_o}\right) \tag{17}$$

$$\sum\nolimits_{G_p} = \sum\nolimits_{G_p}\left(\sigma_B^2, \sum\nolimits_S, \sum\nolimits_D, x_{G_P}\right) \tag{18}$$

Cross covariances between the variables are related as follows:

$$\sum\nolimits_{G_o D_o} = \sum\nolimits_{G_o D_o}\left(\sigma_B^2, \sum\nolimits_D, x_{D_o}\right) \tag{19}$$

$$\sum\nolimits_{G_p D_o} = \sum\nolimits_{G_p D_o}\left(\sigma_B^2, \sum\nolimits_D, x_{G_P}\right) \tag{20}$$

$$\sum\nolimits_{G_p G_o} = \sum\nolimits_{G_o D_o}\left(\sigma_B^2, \sum\nolimits_S, \sum\nolimits_D, x_{G_P}, x_{G_o}\right) \tag{21}$$

$$\sum\nolimits_{B D_o} = \sigma_B^2 1\left(x_{D_o}\right) \tag{23}$$

$$\sum\nolimits_{B G_o} = \sigma_B^2 1\left(x_{G_o}\right) \tag{23}$$

where $1(x)$ is a vector of values 1 of the same length as x.

The look-ahead prediction and associated uncertainty are given by the conditional mean and covariance for the layer boundary in the resistivity domain:

$$\mu_{G_P|D_o G_o} = \mu_{G_P} + A\left(D_o - \mu_{D_o}\right) + B\left(G_o - \mu_{G_o}\right) \tag{24}$$

$$\sum\nolimits_{G_P|D_o G_o} = \sum\nolimits_{G_P} C \sum\nolimits_{D_o G_P} -E \sum\nolimits_{G_o G_p} \tag{25}$$

Where the coefficients A, B, C and E depend on the covariance between variables observed behind the last observation and those ones available ahead.

Far ahead-of-the-bit the prediction converges towards the layer boundary in the seismic domain adjusted by an estimated bulk shift, where the conditional mean and variance of the bulk shift are given by:

$$\mu_{B|D_o G_o} = \mu_B + F\left(D_o - \mu_{D_o}\right) + H\left(G_o - \mu_{G_o}\right) \tag{26}$$

$$\sigma_{B|D_o G_o}^2 = \sigma_B^2 - J \sum\nolimits_{D_o B} - K \sum\nolimits_{G_o B} \tag{27}$$

Where the coefficients F, H, J and K depend on the covariance between variables observed behind the last observation and those available ahead.

The equations above provide an estimate of the mean bulk shift, the look ahead prediction of the surface corresponding to the layer boundary in the resistivity domain and associated uncertainties.

Property Prediction Ahead of the Bit

A joint inversion can be performed behind-the-bit during a real-time drilling operation, combining resistivity from while drilling measurements and acoustic impedance from seismic measurements to estimate reservoir properties such as porosity and water saturation. The inversion may be defined using a Bayesian framework, applied independently for each observation point. Ahead-of-the-bit, on the other hand, acoustic impedance may be available, preventing a joint inversion based on both measurements. In this section, spatial correlations are introduced into the stochastic model to link the properties ahead to the properties behind, hence obtaining some inversion capability also ahead.

Stochastic Model with Spatial Dependencies

Denote the model space variables $m=\{m_i\}$, $i \in \Omega$, representing the unknown reservoir properties (e.g., porosity, water saturation, . . . ) at locations in a set $\Omega$ of size n, and data space variables $d=\{d_i\}$, $i \in \Omega$, representing the available observations (e.g., resistivity, acoustic impedance) at the same locations. At each location i, $m_i$ is a vector of length $n_m$ and $d_i$ a vector of length $n_d=2$, giving total lengths $n_m$n and $n_d$n of m and d respectively. The observations are assumed to be related to the reservoir properties through a rock physics model $g(m; \theta)=\{g(m_i; \theta_i)\}$, $i=1, \ldots, n$, where $\theta_i$ is the parameterisation of the rock physics model at location i. The observations are then expressed as $d=g(m; \theta)+\varepsilon$, where model errors and observation errors are captured in the error term $\varepsilon$.

Using a Bayesian framework, the reservoir properties are assigned a prior distribution f(m), and the observations are linked to the model space variables through a likelihood distribution f(d|m), giving a posterior distribution f(m|d)∝f (d|m)f(m).

Let $m \sim N(\mu_m, \Sigma_m)$ have a Gaussian prior distribution with mean vector $\mu_m=\{\mu_{m_i}\}$, $i \in \Omega$, and covariance matrix $\Sigma_m$, while $\varepsilon \sim N(0, \Sigma_d)$ is Gaussian distributed with zero mean and covariance matrix $\Sigma_d$, giving likelihood distribution $d|m \sim N$ $(g(m; \theta), \Sigma_d)$. Spatial dependencies may be captured in the covariance matrices $\Sigma_m$ and $\Sigma_d$, with non-zero values off the diagonal:

$$\sum\nolimits_M = \begin{bmatrix} \sum_{m_1} & \cdots & \sum_{m_1 m_n} \\ \vdots & \ddots & \vdots \\ \sum_{m_1 m_n}^T & \cdots & \sum_{m_n} \end{bmatrix}, \tag{28}$$

$$\sum\nolimits_d = \begin{bmatrix} \sum_{d_1} & \cdots & \sum_{d_1 d_n} \\ \vdots & \ddots & \vdots \\ \sum_{d_1 d_n}^T & \cdots & \sum_{d_n} \end{bmatrix}$$

The joint prior and likelihood pdfs are expressed as:

$$f(m) \propto \exp\left(-\frac{1}{2}(m - \mu_m)^T \sum\nolimits_m^{-1} (m - \mu_m)\right) \tag{29}$$

-continued $$f(d|m) \propto \exp\left(-\frac{1}{2}(d - g(m;\theta))^T \sum\nolimits_d^{-1} (d - g(m;\theta))\right) \quad (30)$$

This gives a posterior pdf:

$f(m|d) \propto$ $$\exp\left(-\frac{1}{2}\left((m - \mu_m)^T \sum\nolimits_m^{-1} (m - \mu_m) + (d - g(m;\theta))^T \sum\nolimits_d^{-1} (d - g(m;\theta))\right)\right)$$

(31)

Due to the non-linear nature of the rock physics model g(m; θ) the posterior distribution f(m|d) is non-Gaussian, and there is no analytical expression for a maximum a posteriori estimate (MAP) of m. Furthermore, the sizes of the covariance matrices $\Sigma_m$ and $\Sigma_d$ make it numerically challenging to work analytically with the spatially dependent stochastic model. Model simplifications are introduced below to overcome the numerical challenges; hence, a construction of covariance matrices $\Sigma_m$ and $\Sigma_d$ is not discussed here.

Ahead of the Bit Property Prediction

Figures 3A, 3B:
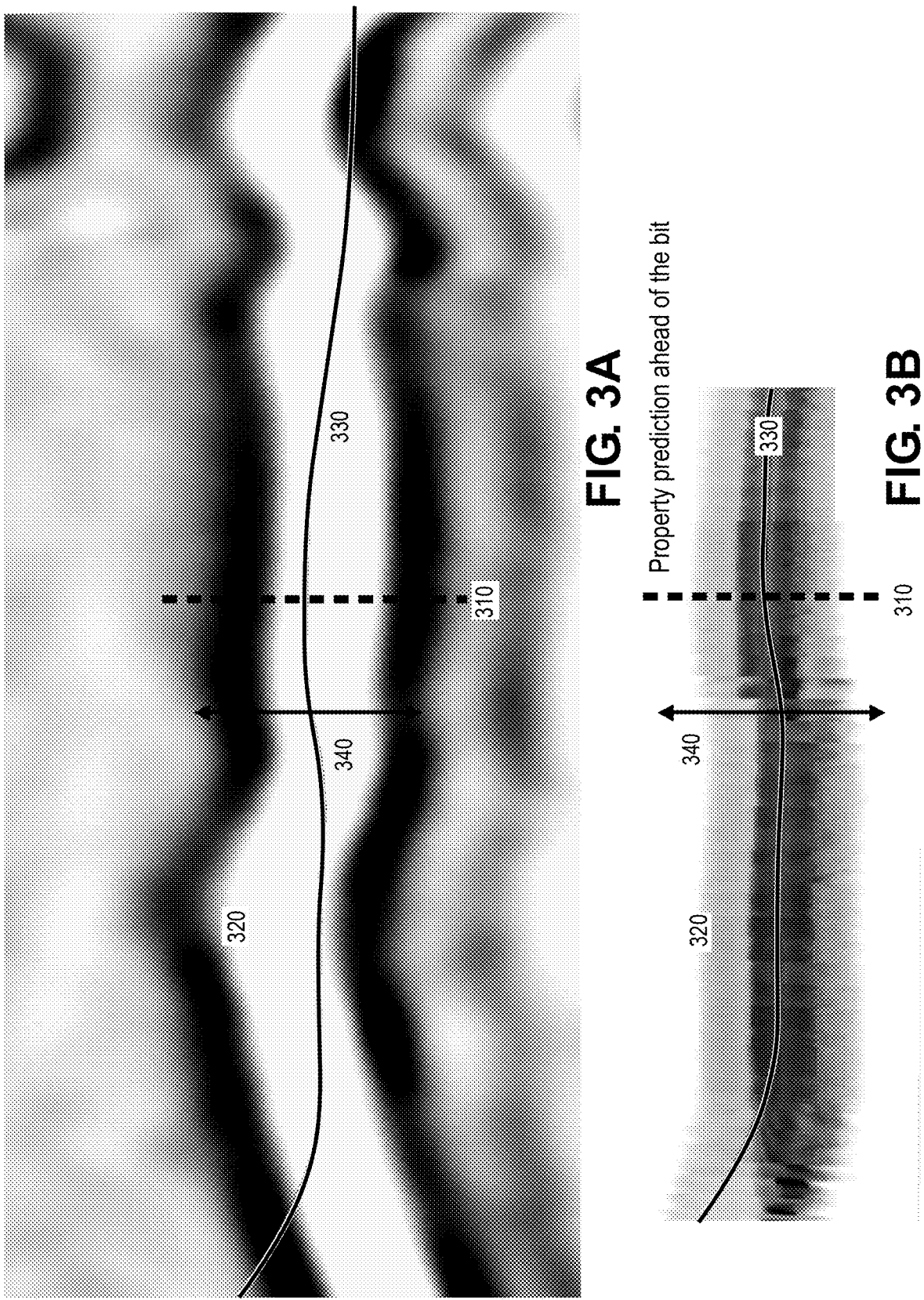
FIGS. 3A and 3B illustrate images showing acoustic impedance (FIG. 3A) along the drilled section behind-the-bit and planned trajectory ahead-of-the-bit, and resistivity (FIG. 3B) split into observations along the drilled section behind-the-bit and unknown variable along the planned trajectory ahead of the bit, according to an embodiment.

FIGS. 3A and 3B illustrate images showing acoustic impedance z (FIG. 3A) along the drilled section behind-the-bit and planned trajectory ahead-of-the-bit, and resistivity (FIG. 3B) split into observations $r_o$ along the drilled section behind-the-bit and unknown variable $r_p$ along the planned trajectory ahead of the bit, according to an embodiment. FIGS. 3A and 3B appear blurry because this is how the images oftentimes look. In FIGS. 3A and 3B, the drill bit is represented by 310, the drilled section behind-the-bit is represented by 320, the planned trajectory ahead-of-the-bit is represented by 330, and the areas to the side(s) of the drill bit 310 are represented by 340.

The data space variables d=[z, r] in the model consists of two data sets, acoustic impedance z and resistivity r. Acoustic impedance may be available from seismic measurements prior to a drilling operation, while resistivity may be obtained from while drilling measurements in real-time while drilling. At a given time during the drilling operation, the set of observation locations $\Omega = \Omega_o \cup \Omega_p$ can be split into a behind-the-bit set $\Omega_o$, where both acoustic impedance and resistivity observations are available, and an ahead-of-the-bit set $\Omega_p$, where the acoustic impedance is available. Subscripts o and p denote the observation space and prediction space with respect to resistivity. Resistivity is split correspondingly, $r=[r_o, r_p]$, into the observed values behind-the-bit, $r_o$, and the unknown values ahead-of-the-bit that are to be predicted, $r_p=\{r_i\}$, $i \in \Omega_p$. The data space variables are then expressed as d=[z, $r_o$, $r_p$], where z and $r_o$ are observed while $r_p$ is unknown, as illustrated in FIGS. 3A and 3B.

The joint posterior distribution of the reservoir properties and the resistivity ahead-of-the-bit is expressed using Bayes theorem as:

$$f(m, r_p | z, r_o) = f(m | z, r_o, r_p) f(r_p | z, r_o) = f(m | d) f(r_p | z, r_o) \quad (32)$$

The first term in the right-hand side of the expression is the posterior distribution defined in equation (31); the posterior distribution of the reservoir properties given the values of the data space variables, including the non-observed resistivity ahead. The second term in the right-hand side of the expression is the conditional distribution of resistivity ahead given resistivity behind and the acoustic impedance, and is defined using Bayes theorem as:

$$f(r_p | z, r_o) = \frac{f(z, r_o, r_p)}{f(z, r_o)} \quad (33)$$

The two joint distributions in the fraction are defined as:

$$f(z, r_o, r_p) = f(d) = \int f(m, d) dm = \int f(d | m) f(m) dm \quad (34)$$

$$f(z, r_o) = \int f(z, r_o, r_p) dr_p \quad (35)$$

Due to the non-linear nature of the rock physics model g (m; θ) involved in the likelihood pdf f(d|m), there is no analytical expression for the integrals defining $f(z, r_o, r_p)$ and $f(z, r_o)$.

Data Space Model Approximation

The distribution f(d) of acoustic impedance and resistivity is not defined as a well-known distribution, and from the nature of variability in resistivity, it is expected to be highly non-Gaussian. Applying a suitable transformation to resistivity ($t(r_p, r_o, z)$), it can be assumed the conditional distribution of resistivity ahead-of-the-bit can be approximately described as Gaussian, i.e.:

$$t(r_p) | z, t(r_o) \approx N\left(\mu_{r_p | z, r_o}, \sum\nolimits_{r_p | z, r_o}\right) \quad (37)$$

Conditional mean and variance are expressed through the mean and covariance values, combined with the observations:

$$\mu_{r_p | z, r_o} = \mu_{r_p} + M\left(\begin{bmatrix} z \\ t(r_o) \end{bmatrix} - \begin{bmatrix} \mu_z \\ \mu_{r_o} \end{bmatrix}\right) \quad (38)$$

$$\sum\nolimits_{r_p | z, r_o} = \sum\nolimits_{r_p} - N\begin{bmatrix} \sum\nolimits_{zr_p} \\ \sum\nolimits_{r_o r_p} \end{bmatrix} \quad (39)$$

Where the vector coefficients, M and N, depend on the covariance.

The pdf of the approximate conditional distribution of resistivity ahead-of-the-bit is given by:

$$\hat{f}(r_p | z, r_o) \propto \exp\left(-\frac{1}{2}\left(t(r_p) - \mu_{r_p | z, r_o}\right)^T \sum\nolimits_{r_p | z, r_o}^{-1} \left(t(r_p) - \mu_{r_p | z, r_o}\right)\right) \quad (40)$$

Down-Sampling of Observations

The data space model approximation provides an analytical representation of the conditional distribution of resistivity ahead-of-the-bit at logarithmic scale, but there are still numerical challenges related to the number of observation points and the corresponding size of covariance matrices to be inverted. This limitation may be handled in the software implementation through down-sampling, where the number of observations $r_o$ from resistivity is reduced by averaging over observations inside windows of fixed horizontal and vertical size and placing the down-sampled observations at the average position of observations in each window. Corresponding acoustic impedances z are extracted from a 3D seismic volume using interpolation between nearby seismic voxels to get the values at the assigned locations of the averaged resistivities. This approach reduces the size of the observation set $\Omega_o$.

The number and location of points in the prediction set $\Omega_p$ may be user-defined and may be for simplicity set to the same horizontal and vertical sample rates as in the down-sampling of $\Omega_o$, distributed ahead-of-the-bit along the planned well trajectory. The same interpolation of acoustic impedance values in $\Omega_p$ is applied as for observations in $\Omega_o$.

Monte Carlo Sampling

An approximation of the marginal distribution $f(d_i)=f(d)$ of a single observation point can be obtained through Monte Carlo sampling, assuming $f(m_i)=f(m)$ and $\theta_i=\theta$ are equal for all locations $i \in \Omega$. Multiple realizations of reservoir properties m are generated from the prior distribution $f(m)$, and corresponding acoustic impedance and resistivity calculated according to the rock physics model $d=g(m; \theta)$. Alternatively, the Monte Carlo sampling can be run repeatedly if $\Omega$ is divided into regions or facies of constant $f(m)$ and $\theta$.

Figures 4A, 4B, 4C:
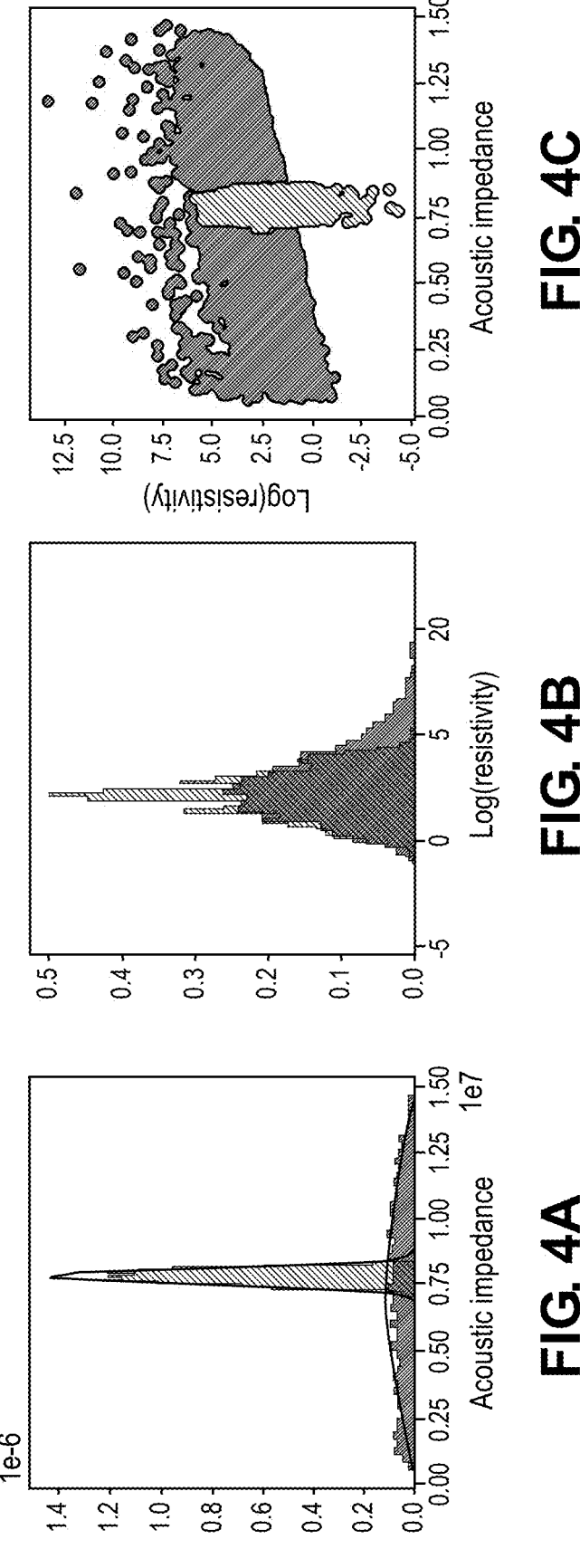
FIGS. 4A-4C illustrate histograms of acoustic impedance (FIG. 4A) and resistivity at logarithmic scale (FIG. 4B) with fitted Gaussian distribution as solid lines, and cross-plot of the two (FIG. 4C), comparing Monte Carlo samples to real observations, according to an embodiment.

FIGS. 4A-4C illustrate histograms of acoustic impedance (FIG. 4A) and resistivity at logarithmic scale (FIG. 4B) with fitted Gaussian distribution as solid lines, and cross-plot of the two (FIG. 4C), comparing Monte Carlo samples to real observations, according to an embodiment. The simulations in FIGS. 4A-4C illustrate that the Gaussian approximation is not perfect, but still considered applicable when transferring the sampled resistivity to logarithmic scale. FIGS. 4A-4C make a comparison of the Monte Carlo samples to real observations, showing a similar range and variability of resistivity values at logarithmic scale. The Monte Carlo sampled acoustic impedance; however, covers a much wider value range than the observed values, indicating that the prior model applied in the Monte Carlo sampling is very wide compared to realistic values for the region of interest.

Spatial Correlations

Instead of incorporating spatial correlations in covariance matrices $\Sigma_m$ and $\Sigma_d$ for m and d, and calculating $f(d)$ through integration as expressed in equation (34), a Gaussian approximation is defined in equation (36) with spatial correlations captured in the covariances matrix defined by the subset of covariances for the variables z, $t(r_o)$, $t(r_p)$. A parametric representation of the covariance structure can be achieved by combining point-by-point standard deviations with the correlation between the different variables in d and a spatial correlation function. Constant, or facies dependent, standard deviations, and the correlation between different variables, can be obtained from the Monte Carlo estimate of $f(d)$ described above. Let $\Omega_{z_i}$ denote the standard deviation of acoustic impedance $z_i$ and $\sigma_{r_i}$ the standard deviation of transformed resistivity $g(r_i)$ at location i. Furthermore, let $\rho_{z_i r_i}$ be the correlation between $z_i$ and $g(r_i)$, and assume that the spatial correlation is similar for the two variables and depends on the distance $\Delta_{ij}$ between the observations, given by $\rho(\Delta_{ij})$. Covariance matrices in equation (36) are then defined as:

$$\sum\nolimits_z = \{\sigma_{z_i}\sigma_{z_j}\rho(\Delta_{ij})\}, i, j \in \Omega \tag{41}$$

$$\sum\nolimits_{r_o} = \{\sigma_{r_i}\sigma_{r_j}\rho(\Delta_{ij})\}, i, j \in \Omega_o \tag{42}$$

$$\sum\nolimits_{r_p} = \{\sigma_{r_i}\sigma_{r_j}\rho(\Delta_{ij})\}, i, j \in \Omega_p \tag{43}$$

-continued $$\sum\nolimits_{zr_o} = \{\sigma_{z_i}\sigma_{r_j}\rho_{z_i r_j}\rho(\Delta_{ij})\}, i \in \Omega, j \in \Omega_o \tag{44}$$

$$\sum\nolimits_{zr_p} = \{\sigma_{z_i}\sigma_{r_j}\rho_{z_i r_j}\rho(\Delta_{ij})\}, i \in \Omega, j \in \Omega_p \tag{45}$$

$$\sum\nolimits_{r_o r_p} = \{\sigma_{r_i}\sigma_{r_j}\rho(\Delta_{ij})\}, i \in \Omega_o, j \in \Omega_p \tag{46}$$

The $\Delta_{ij}$ is the distance between observation points i at $(x_i, y_i, z_i)$ and j at $(x_j, y_j, z_j)$. Correlation functions $\rho(\Delta_{ij})$ can be parameterized through correlation lengths, defined for 1D correlation functions as the distance at which correlation falls below a predefined threshold.

Bayesian Inversion

An approximate expression for the joint posterior pdf (2) of the reservoir properties and the resistivity behind-the-bit is obtained by combining the expressions of the posterior pdf $f(m|d)$ in equation (31) and the approximate pdf $\hat{f}(r_p|z, r_o)$ in equation (40):

$$\hat{f}(m, r_p \mid z, r_o) = f(m \mid d)\hat{f}(r_p \mid z, r_o) \propto \tag{49}$$
$$\exp\left(-\frac{1}{2}\left((m - \mu_m)^T \sum\nolimits_m^{-1}(m - \mu_m) + (d - g(m; \theta))^T \sum\nolimits_d^{-1}(d - g(m; \theta)) + \left(t(r_p) - \mu_{r_p|z,r_o}\right)^T \sum\nolimits_{r_p|z,r_o}^{-1}\left(t(r_p) - \mu_{r_p|z,r_o}\right)\right)\right)$$

The numerical complexity of $f(m|d)$ related to the non-linear rock physics model $g(m; \theta)$ is now further enhanced by the logarithmic representation of the resistivity in $\hat{f}(r_p|z, r_o)$. As a solution, simplifications are suggested to enable estimation of m and $r_p$ from $f(m, r_p|z, r_o)$, both in the model definition and in the calculation of the inversion.

Model Simplification

A model simplification may be obtained by removing the spatial elements in the prior distribution $f(m)$ and likelihood distribution $f(d|m)$, using covariances matrices where data at different locations are independent:

$$\sum\nolimits_m = \begin{bmatrix} \sum_{m_1} & \cdots & 0 \\ \vdots & \ddots & \vdots \\ 0 & \cdots & \sum_{m_n} \end{bmatrix}, \sum\nolimits_d = \begin{bmatrix} \sum_{d_1} & \cdots & 0 \\ \vdots & \ddots & \vdots \\ 0 & \cdots & \sum_{d_n} \end{bmatrix} \tag{50}$$

This represents using the same pdfs as for the original point-by-point joint inversion, where the joint pdfs are now expressed as products of marginal pdfs:

$$f(m) = \prod\nolimits_i f(m_i) \propto \exp\left(-\frac{1}{2}\sum\nolimits_i (m_i - \mu_{m_i})^T \sum\nolimits_{m_i}^{-1}(m_i - \mu_{m_i})\right) \tag{51}$$

$$f(d \mid m) = \prod\nolimits_i f(d_i \mid m_i) \propto \exp\left(-\frac{1}{2}\sum\nolimits_i (d_i - g(m_i))^T \sum\nolimits_{d_i}^{-1}(d_i - g(m_i))\right) \tag{52}$$

The posterior pdf $f(m|d)$ can then be expressed as a product of marginal prior and likelihood pdfs:

$$f(m \mid d) = \prod\nolimits_i f(m_i \mid d_i) \propto \prod\nolimits_i f(d_i \mid m_i)f(m_i) \tag{53}$$

Using the simplified model in equation (53) with $d_i=[z_i, r_i]$ together with the approximate pdf in equation (40), the joint posterior pdf in equation (2) now becomes:

$$f(m, r_p \mid z, r_o) \approx \prod_i f(z_i, r_i \mid m_i) f(m_i) \times f(r_p \mid z, r_o) \tag{54}$$

Inversion Scheme Simplification

A two-step inversion approach is introduced to obtain estimates of $r_p$ and m from the simplified posterior pdf in equation (54), instead of maximizing the complete pdf for a joint MAP estimate.

Step 1: Calculate the conditional mean and covariance (38) and (39) of resistivity $r_p$ ahead-of-the-bit using the approximate conditional distribution in equation (40), and consider the parameters of the marginal Gaussian distributions at logarithmic scale:

$$\mu_{r_p \mid z, r_o} = \{\mu_{r_i \mid z, r_o}\}, i \in \Omega_p \tag{55}$$

$$\mathrm{diag}\left(\sum_{r_p \mid z, r_o}\right) = \{\sigma^2_{r_i \mid z, r_o}\}, i \in \Omega_p \tag{56}$$

Convert the mean and variance of the marginal distributions point-by-point to mean and variance at linear scale to obtain an estimate of the resistivity with an associated uncertainty:

$$\hat{r}_i = \hat{E}[r_i \mid z, r_o] = R\left(\mu_{r_i \mid z, r_o}, \frac{\sigma^2_{r_i \mid z, r_o}}{2}\right), i \in \Omega_p \tag{57}$$

$$\hat{\mathrm{Var}}[r_i \mid z, r_o] = V(\mu_{r_i \mid z, r_o}, \sigma^2_{r_i \mid z, r_o}), i \in \Omega_p \tag{58}$$

Functions R and V are defined to transform back the mean and variance to the resistivity domain.

Step 2: Estimate reservoir properties through point-by-point joint inversion using acoustic impedance z from seismic observations together with the resistivity observations $r_o$ behind-the-bit and the estimated resistivity $\hat{r}_p = \{\hat{r}_i\}$, $i \in \Omega_p$ ahead-of-the-bit:

$$\hat{m}_i = \begin{cases} \underset{m}{\mathrm{argmax}} \, f(z_i, r_i \mid m) f(m), i \in \Omega_o \\ \underset{m}{\mathrm{argmax}} \, f(z_i, \hat{r}_i \mid m) f(m), i \in \Omega_p \end{cases} \tag{59}$$

The second step is identical to the previously established method for joint inversion applied behind-the-bit, but using an estimated rather than observed resistivity ahead-of-the-bit.

The method may obtain a prediction of a reservoir's structural framework, and associated uncertainty, in real time, described in 3D around the current well trajectory in front and to the side of the drilled section. Such a structural framework may refer to layer boundaries (e.g., top of the reservoir, OWC, and other boundaries), discontinuities (e.g., due to the presence of faults in the vicinity of the well trajectory), and any other structural feature that could be expected along a well trajectory. Integrated seismic data and its structural interpretation together with logging while drilling electrical property measurements and their corresponding uncertainties may be used to obtain a prediction of the spatial position and associated uncertainty of surfaces, such as top reservoir horizons and faults, in front and to the side of the drilled section.

In another embodiment, a stochastic framework is implemented such that a prediction of layer boundaries ahead and to the side of the drilled section may be derived from the joint statistical distribution of the layer boundaries interpreted from seismic data behind, ahead and to the side of the drilled section and the layer boundaries interpreted from observations of resistivity behind the bit. In another embodiment, the same stochastic framework may be used to derive a confidence interval of the predicted spatial position of the layer boundaries, such as top reservoir horizons, in front and to the side of the drilled section.

In another embodiment, the predicted uncertainty of boundary position may be used to compute and visualize for further analysis the percentile estimates (e.g., but not limited to: p10, p90) of a boundary position, or upper and lower estimates of boundary position (e.g., but not limited to displaying +/−2 the standard deviation).

In another embodiment, drilling decisions may be made based upon defining a range of possible boundary positions, which may give rise to a multiplicity of optional well trajectories planned ahead of the bit.

In another embodiment, uncertainty in the estimates of resistivity distribution from the LWD can be incorporated, for example (but not limited to) by sampling multiple realizations of resistivity distribution within a confidence interval, then multiple predictions ahead with uncertainty can be used to further improve the accuracy of the uncertainty estimation.

In another embodiment, a prediction of the electrical properties of the formation and associated uncertainty may be obtained, in real time, and described in 3D around the current well trajectory in front and to the sides of the drilled section.

In another embodiment, integrated post-processing of seismic data and associated spatial distribution of a reservoir property (e.g., acoustic impedance) together with logging while drilling electrical property measurements (e.g., resistivity, conductivity, etc.) and their corresponding uncertainties, may be used to obtain a prediction of the resistivity data in front and to the sides of the drilled section.

In another embodiment, a stochastic framework may be implemented such that a prediction of an electrical property (e.g., resistivity) ahead of the bit may be derived from the joint spatial distribution of the electrical property and reservoir properties (e.g., acoustic impedance), using observations of electrical properties behind the bit and observations of reservoir properties behind, in front and to the sides of the drilled section.

In another embodiment, the predicted electrical properties and corresponding acoustic properties may be jointly inverted to produce a prediction of the reservoir properties (e.g., porosity, saturation, etc.) in front and to the sides of the drilled section. The methods described above where the predictions of structure, electrical, and reservoir properties are performed in real time while the drilling operations are going on. In another embodiment, the predicted resistivity in front and to the sides of the drilled section may be used as an initial guess to refine the inversion of measurements recorded while drilling.

Exemplary Method

Figure 5:
FIG. 5 illustrates a flowchart of the method for predicting a reservoir's structure, petrophysical properties, and associated uncertainty in front of a drilling bit while drilling, according to an embodiment.
Figure 5:
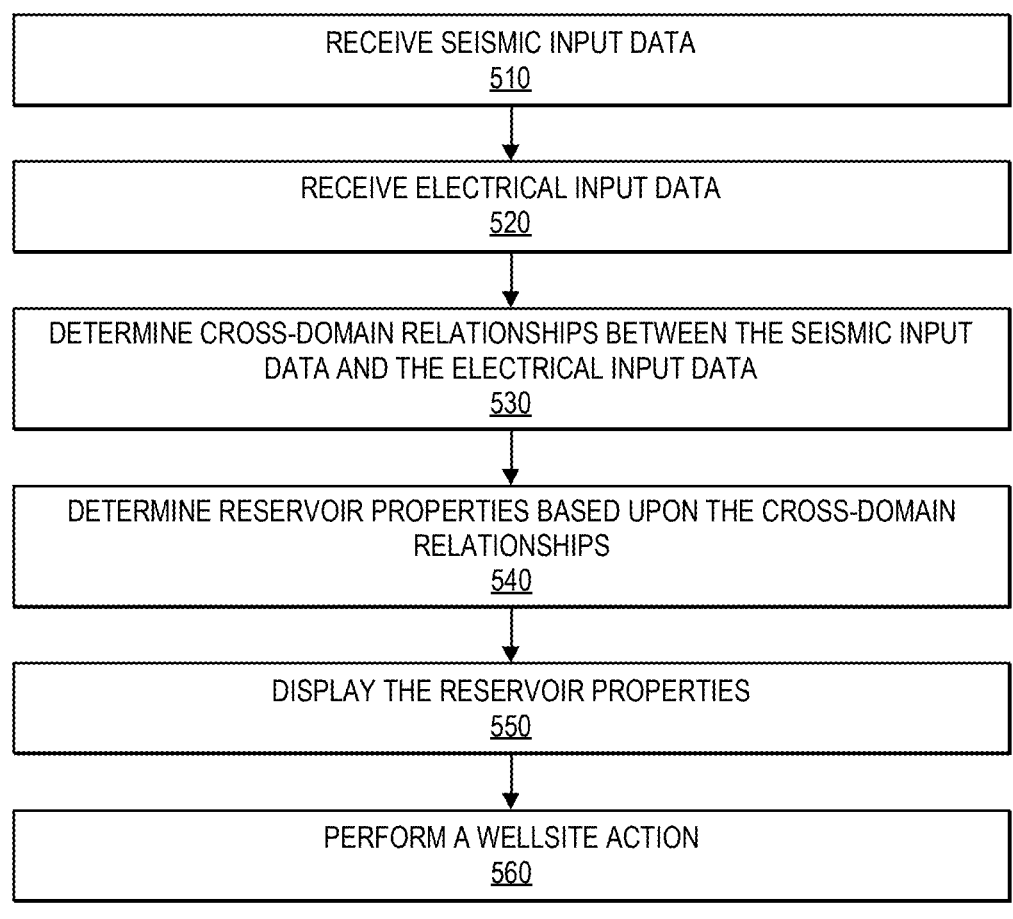

FIG. 5 illustrates a flowchart of a method for predicting a reservoir's structure, petrophysical properties, and associated uncertainty in front of a drilling bit while drilling, according to an embodiment. An illustrative order of the method 500 is provided below; however, one or more portions of the method 500 may be performed in a different order, simultaneously, repeated, or omitted. At least a portion of the method 500 may be performed with a computing system 700 (described below).

The method 500 may include receiving seismic input data, as at 510. The seismic input data may be captured before drilling begins. The seismic input data may be measured behind, to the sides of, and/or in front of a drill bit. The seismic input data may include acoustic impedance measurements and/or seismic amplitude measurements. The seismic input data may also or instead include spatial correlations between the acoustic impedance measurements behind the drill bit and the acoustic impedance measurements to the sides of and/or in front of the drill bit. The seismic input data may also include seismic uncertainties including measurement errors, noise, and/or natural variability.

The method 500 may also include receiving electrical input data, as at 520. The electrical input data may be captured after drilling begins (e.g., while drilling). The electrical input data may be measured behind the drill bit. In an embodiment, the electrical input data may not be measured to the sides of and/or in front of the drill bit. The electrical input data may include logging-while-drilling (LWD) electrical property measurements including resistivity measurements. The electrical input data may also or instead include spatial correlations between the resistivity measurements behind the drill bit and unknown resistivity measurements to the sides of and/or in front of the drill bit. The electrical input data may also include electrical uncertainties including measurement errors, noise, and/or natural variability.

The method 500 may also include determining cross-domain relationships between the seismic input data and the electrical input data, as at 530. The cross-domain relationships may be determined using a multivariate stochastic model. The cross-domain relationships may include correlations between the acoustic impedance measurements and the resistivity measurements. The correlations between the acoustic impedance measurements and the resistivity measurements may be estimated based upon the seismic input data and the LWD electrical property measurements behind the drill bit. The correlations between the acoustic impedance measurements and the resistivity measurements may be derived using a joint model of rock physics and electrical properties. The joint model may include empirical analytical relations between the acoustic impedance measurements, the resistivity measurements, reservoir properties, or a combination thereof.

The cross-domain relationships may also or instead include correlations between positions of interfaces (e.g., sensors on/in the downhole tool) that capture the acoustic impedance measurements and positions of interfaces that capture the resistivity measurements. The positions of the interfaces that capture the acoustic impedance measurements and the positions of the interfaces that capture the resistivity measurements may be estimated based upon the seismic input data and the LWD electrical property measurements behind the drill bit.

The cross-domain relationships may also or instead include correlations between the seismic amplitude measurements and the unknown resistivity measurements to the sides of and/or in front of the drill bit.

The method 500 may also include determining reservoir properties to the sides and/or in front of a trajectory of a well being drilled by the drill bit, as at 540. The reservoir properties may be determined based upon the spatial correlations of the seismic input data, the spatial correlations of the electrical input data, the cross-domain relationships, or a combination thereof. A stochastic model may be used to determine a conditional mean and covariance of the reservoir properties conditioned on the acoustic impedance measurements behind, to the sides of, and/or in front of the drill bit and the resistivity measurements behind the drill bit. The stochastic model may determine the conditional mean and the covariance of the positions of interfaces that capture the resistivity measurements conditioned on the positions of the interfaces that capture the acoustic impedance measurements behind, to the sides of, and/or in front of the drill bit and the positions of interfaces that capture the resistivity measurements behind the drill bit.

Figure 6A:
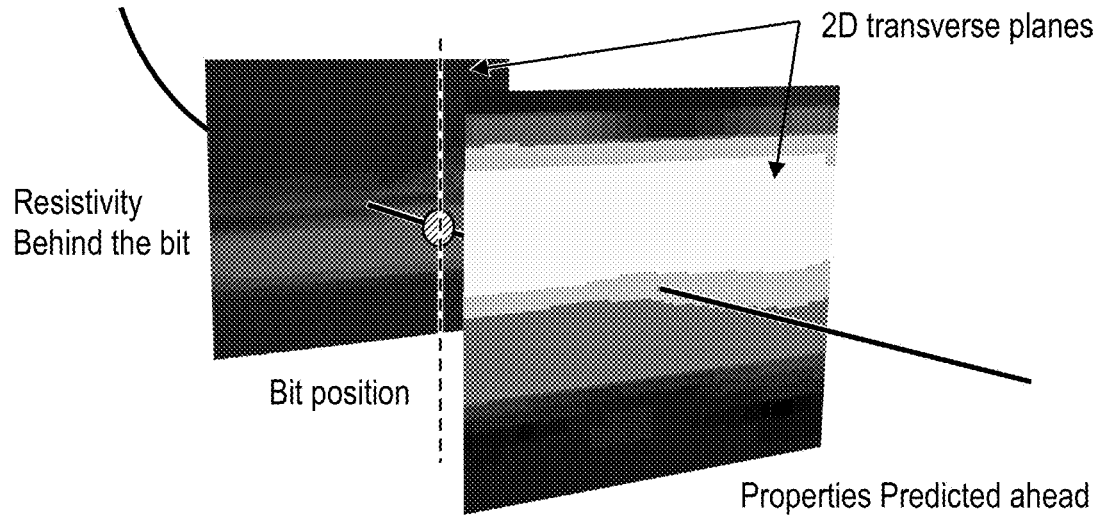
FIGS. 6A and 6B illustrate images showing the reservoir properties, according to an embodiment.
Figure 6B:
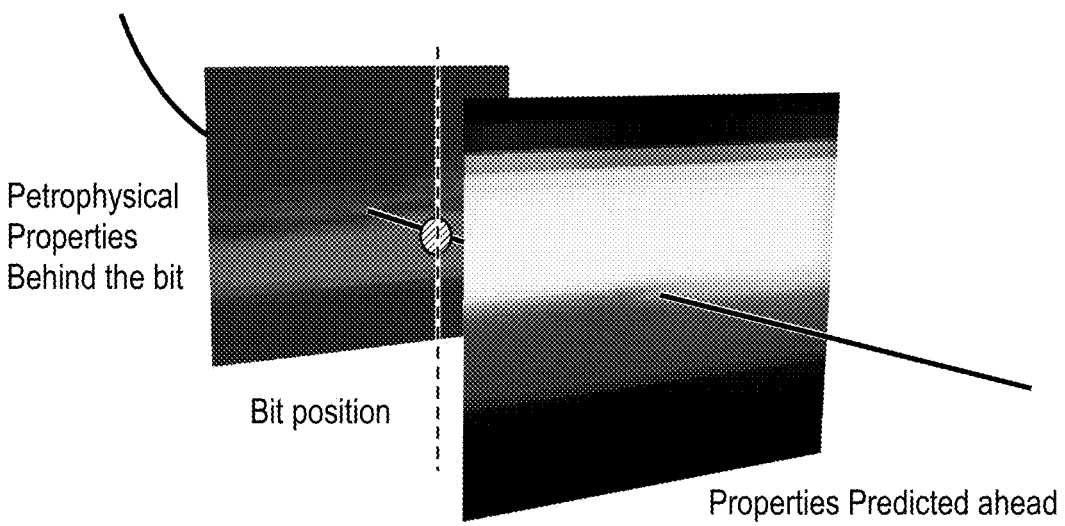

The method 500 may also include displaying the reservoir properties, as at 550. The reservoir properties may be displayed in a 2D plane or extrapolated as a 3D cube. The reservoir properties may be shown along the trajectory of the well or transverse to the trajectory of the well when displayed in the 2D plane. FIGS. 6A and 6B illustrate images showing the reservoir properties, according to an embodiment. More particularly, FIGS. 6A and 6B illustrate the concept of the prediction of properties in a 2D plane transverse to the well trajectory, both behind and ahead of the drill bit.

The method 500 may also include performing a wellsite action based upon or in response to the reservoir properties, as at 560. The wellsite action may be or include generating and/or transmitting a signal that recommends, instructs, or causes a physical action to occur to the drill bit and/or the well. The physical action may be or include steering the drill bit to vary the trajectory of the well. The physical action may also or instead include adjusting a pressure using a pump at the surface, adjusting a flow rate into and/or out of the well using the pump, varying a weight and/or torque on the drill bit, varying a concentration and/or flow rate of a fluid pumped into the well, selecting where to drill a new well, or drilling the new well.

Exemplary Computing System

Figure 7:
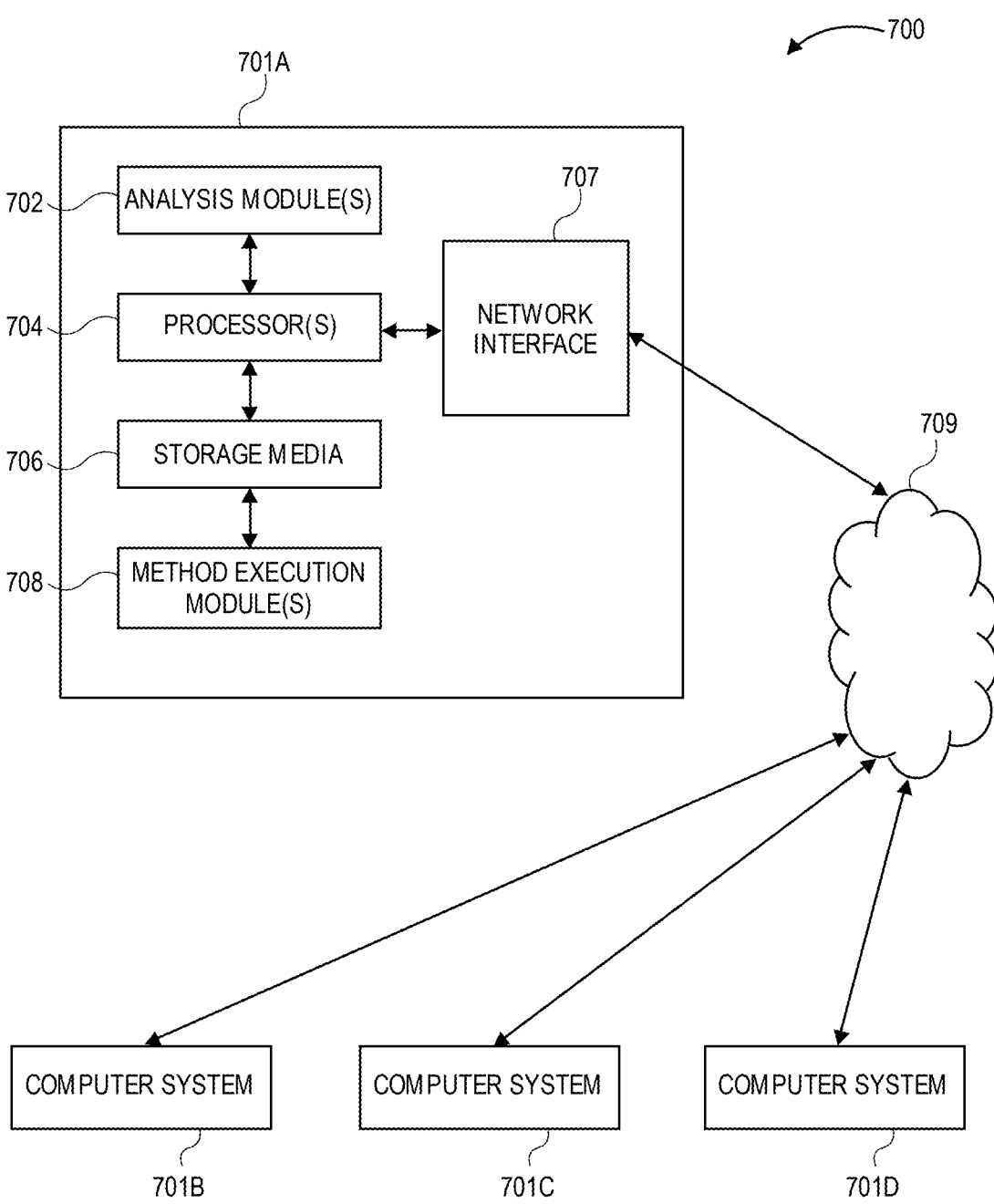
FIG. 7 illustrates a schematic view of a computing system for performing at least a portion of the method(s) described herein, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more method execution module(s) 708. In the example of computing system 700, computer system 701A includes the method execution module 708. In some embodiments, a single method execution module may be used to perform some aspects of one or more embodiments of the methods disclosed herein. In other embodiments, a plurality of method execution modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purposes of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for predicting a reservoir's structure, petrophysical properties, and associated uncertainty in front of a drill bit while drilling, the method comprising:
receiving seismic input data that is captured before drilling begins;
receiving electrical input data that is captured after drilling begins, wherein the electrical input data comprises spatial correlations between resistivity measurements behind the drill bit and unknown resistivity measurements to the sides of and/or in front of the drill bit;
determining cross-domain relationships between the seismic input data and the electrical input data;
determining reservoir properties on sides of and/or in front of a trajectory of a well being drilled by a drill bit based upon the cross-domain relationships; and
generating a display that shows the trajectory extending through one or more transverse planes that represent the reservoir properties behind the drill bit and/or in front of the drill bit.

2. The method of claim 1, wherein the seismic input data is measured behind, to the sides of, and/or in front of the drill bit, and wherein the seismic input data comprises acoustic impedance measurements and/or seismic amplitude measurements.

3. The method of claim 2, wherein the seismic input data comprises spatial correlations between the acoustic impedance measurements behind the drill bit and the acoustic impedance measurements to the sides of and/or in front of the drill bit.

4. The method of claim 3, wherein the reservoir properties are also determined based upon the spatial correlations.

5. The method of claim 1, wherein the electrical input data is measured behind the drill bit but not in front of the drill bit, and wherein the electrical input data comprises logging-while-drilling (LWD) electrical property measurements including resistivity measurements.

6. The method of claim 1, wherein the reservoir properties are also determined based upon the spatial correlations.

7. The method of claim 1, wherein the seismic input data comprises acoustic impedance measurements, wherein the electrical input data comprises resistivity measurements, and wherein a stochastic model is used to determine a conditional mean and covariance of the reservoir properties conditioned on the acoustic impedance measurements behind, to the sides of, and/or in front of the drill bit and the resistivity measurements behind the drill bit.

8. The method of claim 1, further comprising steering the drill bit to vary the trajectory of the well in response to the reservoir properties.

9. The method of claim 1, wherein the one or more transverse planes comprise a first transverse plane that represents the reservoir properties behind the drill bit and a second transverse plane that represents the reservoir properties in front of the drill bit.

10. The method of claim 9, wherein the drill bit is shown along the trajectory and between the first and second transverse planes.

11. The method of claim 9, wherein the first transverse plane also shows a resistivity and petrophysical properties behind the drill bit.

12. A computing system, comprising:

one or more processors; and a memory system comprising one or more non-transitory computer-readable media storing instructions that, when executed by at least one of the one or more processors, cause the computing system to perform operations comprising:

receiving seismic input data, wherein the seismic input data is captured before drilling begins, wherein the seismic input data is measured behind, on sides of, and in front of a drill bit, wherein the seismic input data comprises acoustic impedance measurements and/or seismic amplitude measurements, and wherein the seismic input data comprises spatial correlations between the acoustic impedance measurements behind the drill bit and the acoustic impedance measurements to the sides of and/or in front of the drill bit;

receiving electrical input data, wherein the electrical input data is captured after drilling begins, wherein the electrical input data is measured behind the drill bit, wherein the electrical input data comprises logging-while-drilling (LWD) electrical property measurements including resistivity measurements, and wherein the electrical input data comprises spatial correlations between the resistivity measurements behind the drill bit and unknown resistivity measurements to the sides of and/or in front of the drill bit;

determining cross-domain relationships between the seismic input data and the electrical input data;

determining reservoir properties to the sides and/or in front of a trajectory of a well being drilled by the drill bit based upon the spatial correlations of the seismic input data, the spatial correlations of the electrical input data, and the cross-domain relationships; and generating a display that shows the trajectory extending through one or more transverse planes that represent the reservoir properties behind the drill bit and/or in front of the drill bit.

13. The computing system of claim 12, wherein the cross-domain relationships comprise correlations between the acoustic impedance measurements and the resistivity measurements, wherein the correlations between the acoustic impedance measurements and the resistivity measurements are estimated based upon the seismic input data and the LWD electrical property measurements behind the drill bit, wherein the correlations between the acoustic impedance measurements and the resistivity measurements are derived using a joint model of rock physics and electrical properties, and wherein the joint model comprises empirical analytical relations between the acoustic impedance measurements, the resistivity measurements, and reservoir properties.

14. The computing system of claim 12, wherein the cross-domain relationships comprise correlations between positions of interfaces that capture the acoustic impedance measurements and positions of interfaces that capture the resistivity measurements, and wherein the positions of the interfaces that capture the acoustic impedance measurements and the positions of the interfaces that capture the resistivity measurements are estimated based upon the seismic input data and the LWD electrical property measurements behind the drill bit.

15. The computing system of claim 14, wherein a stochastic model is used to determine a conditional mean and covariance of the reservoir properties conditioned on the acoustic impedance measurements behind, to the sides of, and/or in front of the drill bit and the resistivity measurements behind the drill bit, wherein the stochastic model determines the conditional mean and the covariance of the positions of interfaces that capture the resistivity measurements conditioned on the positions of the interfaces that capture the acoustic impedance measurements behind, to the sides of, and/or in front of the drill bit and the positions of interfaces that capture the resistivity measurements behind the drill bit.

16. The computing system of claim 12, wherein the cross-domain relationships comprise correlations between the seismic amplitude measurements and the unknown resistivity measurements to the sides of and/or in front of the drill bit.

17. A non-transitory computer-readable medium storing instructions that, when executed by one or more processors of a computing system, cause the computing system to perform operations, the operations comprising:

receiving seismic input data, wherein the seismic input data is captured before drilling begins, wherein the seismic input data is measured behind, to the sides of, and in front of a drill bit, wherein the seismic input data comprises acoustic impedance measurements and seismic amplitude measurements, wherein the seismic input data comprises spatial correlations between the acoustic impedance measurements behind the drill bit and the acoustic impedance measurements to the sides of and/or in front of the drill bit;

receiving electrical input data, wherein the electrical input data is captured while drilling, wherein the electrical input data is measured behind the drill bit, wherein the electrical input data comprises logging-while-drilling (LWD) electrical property measurements including resistivity measurements, wherein the electrical input data comprises spatial correlations between the resistivity measurements behind the drill bit and unknown resistivity measurements to the sides of and/or in front of the drill bit;

determining cross-domain relationships between the seismic input data and the electrical input data, wherein the cross-domain relationships are determined using a multivariate stochastic model;

determining reservoir properties to the sides and/or in front of a trajectory of a well being drilled by the drill bit based upon the spatial correlations of the seismic input data, the spatial correlations of the electrical input data, and the cross-domain relationships; and generating a display that shows the trajectory extending through one or more transverse planes that represent the reservoir properties behind the drill bit and/or in front of the drill bit.

18. The non-transitory computer-readable medium of claim 17, wherein the operations further comprise performing a wellsite action based upon or in response to the reservoir properties.

19. The non-transitory computer-readable medium of claim 18, wherein the wellsite action comprises generating and/or transmitting a signal that recommends, instructs, or causes a physical action to occur to the drill bit and/or the well.

20. The non-transitory computer-readable medium of claim 19, wherein the physical action comprises steering the drill bit to vary the trajectory of the well.

\* \* \* \* \*